US007103794B2

(12) United States Patent
Malcolm et al.

(10) Patent No.: US 7,103,794 B2
(45) Date of Patent: Sep. 5, 2006

(54) NETWORK OBJECT CACHE ENGINE

(75) Inventors: Michael Malcolm, Woodside, CA (US);
Robert Zarnke, Waterloo (CA)

(73) Assignee: Cacheflow, Inc., Sunnyvale, CA (US)

( * ) Notice: Subject to any disclaimer, the term of this patent is extended or adjusted under 35 U.S.C. 154(b) by 1381 days.

(21) Appl. No.: 09/093,533

(22) Filed: Jun. 8, 1998

(65) Prior Publication Data

US 2002/0004917 A1 Jan. 10, 2002

(51) Int. Cl.
*G06F 11/00* (2006.01)

(52) U.S. Cl. .............................. 714/4; 709/203; 711/118
(58) Field of Classification Search ...................... 714/4; 709/201–203, 212–229; 707/100–104; 711/100–154; 345/557
See application file for complete search history.

(56) References Cited

U.S. PATENT DOCUMENTS

| | | | |
|---|---|---|---|
| 5,452,440 A | 9/1995 | Salsburg | |
| 5,452,447 A | 9/1995 | Nelson et al. | ............... 395/650 |
| 5,564,011 A | 10/1996 | Yammine et al. | ............. 714/15 |
| 5,596,774 A | 1/1997 | Dao et al. | .................... 395/610 |

(Continued)

FOREIGN PATENT DOCUMENTS

| | | |
|---|---|---|
| EP | 0359384 A3 | 3/1990 |
| EP | 0359384 A2 | 3/1990 |
| EP | 0359384 B1 | 3/1990 |
| EP | 0481716 A2 | 4/1992 |
| EP | 0 836 145 A2 | 4/1998 |
| EP | 0 836 145 A2 | 4/1998 |
| WO | WO 97/01765 A1 | 1/1997 |
| WO | WO 97 30539 | 8/1997 |

OTHER PUBLICATIONS

Dias G. et ali: "A Smart Internet Caching System" Proceeding of the Inet'96 Conference, Montreal, Canada, Jun. 24–28, 1996.

(Continued)

*Primary Examiner*—James P. Trammell
*Assistant Examiner*—Mary Wang
(74) *Attorney, Agent, or Firm*—Swernofskya Law Group PC

(57) ABSTRACT

The invention provides a method and system for caching information objects transmitted using a computer network. A cache engine determines directly when and where to store those objects in a memory (such as RAM) and mass storage (such as one or more disk drives), so as to optimally write those objects to mass storage and later read them from mass storage, without having to maintain them persistently. The cache engine actively allocates those objects to memory or to disk, determines where on disk to store those objects, retrieves those objects in response to their network identifiers (such as their URLs), and determines which objects to remove from the cache so as to maintain sufficient operating space. The cache engine collects information to be written to disk in write episodes, so as to maximize efficiency when writing information to disk and so as to maximize efficiency when later reading that information from disk. The cache engine performs write episodes so as to atomically commit changes to disk during each write episode, so the cache engine does not fail in response to loss of power or storage, or other intermediate failure of portions of the cache. The cache engine also stores key system objects on each one of a plurality of disks, so as to maintain the cache holographic in the sense that loss of any subset of the disks merely decreases the amount of available cache. The cache engine also collects information to be deleted from disk in delete episodes, so as to maximize efficiency when deleting information from disk and so as to maximize efficiency when later writing to those areas having former deleted information. The cache engine responds to the addition or deletion of disks as the expansion or contraction of the amount of available cache.

57 Claims, 4 Drawing Sheets

U.S. PATENT DOCUMENTS

| | | | |
|---|---|---|---|
| 5,649,154 A | | 7/1997 | Kumar et al. |
| 5,696,932 A | * | 12/1997 | Smith .......................... 711/118 |
| 5,696,948 A | * | 12/1997 | Cruz et al. ................... 395/550 |
| 5,737,635 A | * | 4/1998 | Daines et al. ................. 710/52 |
| 5,752,022 A | | 5/1998 | Chiu et al. ................... 395/610 |
| 5,778,168 A | * | 7/1998 | Fuller .......................... 714/18 |
| 5,781,785 A | | 7/1998 | Rowe et al. ................ 395/774 |
| 5,787,470 A | | 7/1998 | DeSimone et al. ......... 711/124 |
| 5,802,292 A | | 9/1998 | Mogul .................... 395/200.33 |
| 5,819,045 A | | 10/1998 | Raman et al. |
| 5,822,539 A | | 10/1998 | Van Hoff ............... 395/200.66 |
| 5,822,757 A | * | 10/1998 | Chi ........................... 711/129 |
| 5,826,253 A | | 10/1998 | Bredenberg ..................... 707/2 |
| 5,852,717 A | | 12/1998 | Bhide et al. ........... 395/200.33 |
| 5,860,106 A | | 1/1999 | Domen et al. |
| 5,864,837 A | | 1/1999 | Maimone ....................... 707/1 |
| 5,864,852 A | | 1/1999 | Luotonen ..................... 713/201 |
| 5,870,765 A | | 2/1999 | Bauer et al. ................ 709/203 |
| 5,870,769 A | | 2/1999 | Freund ....................... 707/501 |
| 5,878,218 A | | 3/1999 | Maddalozzo et al. ... 395/200.43 |
| 5,878,223 A | | 3/1999 | Becker et al. .............. 709/223 |
| 5,884,046 A | | 3/1999 | Antonov ................ 395/200.68 |
| 5,887,151 A | | 3/1999 | Raz et al. |
| 5,892,909 A | | 4/1999 | Grasso et al. ................ 709/201 |
| 5,892,937 A | | 4/1999 | Caccavate |
| 5,896,506 A | | 4/1999 | Ali et al. ................ 395/200.43 |
| 5,898,833 A | | 4/1999 | Kidder ........................ 709/234 |
| 5,905,999 A | | 5/1999 | Liu et al. |
| 5,913,033 A | | 6/1999 | Grout ..................... 395/200.49 |
| 5,918,013 A | | 6/1999 | Mighdoll et al. ...... 395/200.47 |
| 5,931,904 A | | 8/1999 | Banga et al. ............... 709/219 |
| 5,933,849 A | | 8/1999 | Dutta et al. ................. 711/118 |
| 5,935,213 A | * | 8/1999 | Rananand et al. ........... 709/234 |
| 5,946,682 A | | 8/1999 | Wolfe ........................... 707/5 |
| 5,948,062 A | | 9/1999 | Tzelnic ........................ 709/219 |
| 5,950,205 A | | 9/1999 | Aviani, Jr. ................... 707/103 |
| 5,954,795 A | | 9/1999 | Tomita et al. ............... 709/218 |
| 5,961,602 A | | 10/1999 | Thompson et al. ......... 709/229 |
| 5,964,830 A | | 10/1999 | Durrett ........................ 709/200 |
| 5,978,848 A | * | 11/1999 | Maddalozzo, Jr. et al. . 709/227 |
| 6,009,466 A | * | 12/1999 | Axberg et al. .............. 709/220 |
| 6,012,085 A | | 1/2000 | Yohe et al. .................. 709/217 |
| 6,012,126 A | * | 1/2000 | Aggarwal et al. ........... 711/133 |
| 6,014,671 A | | 1/2000 | Castelli et al. .............. 707/101 |
| 6,016,512 A | | 1/2000 | Huitema ...................... 709/245 |
| 6,026,474 A | | 2/2000 | Carter et al. ................ 711/202 |
| 6,085,193 A | | 7/2000 | Malkin et al. ................. 707/10 |
| 6,098,096 A | | 8/2000 | Tsirigotis et al. ........... 709/213 |
| 6,209,020 B1 | * | 3/2001 | Angle et al. ................ 709/108 |
| 6,223,256 B1 | * | 4/2001 | Gaither ....................... 711/134 |

OTHER PUBLICATIONS

Glassman S: "A caching relay for the World Wide Web" Computer Networks and Ison Systems, vol. 27, No. 2, Nov. 1994, p. 165–173.

Zhimel Jiang et al; "Prefetching links on the WWW", 97 IEEE International Conference on Communications. Towards the Knowledge Millennium. ICC'97. Montreal, Que., Canada, Jun. 8–12 1997, pp. 483–489 vol. 1.

Dingle A, et al: "Web cache coherence" Computer Networks and Ison Systems, vol. 28, No. 11, May 1996, p. 907–920.

Nabeshima M: "The Japan Cache Project: an experiment on domain cache". Computer Networks and Ison Systems, vol. 29, No. 8–13, Sep. 1997, p. 987–995.

Wang Z et al: "Prefetching in World Wide Web". IEEE Globecom 1996, Communications: The Key to Global Prosperity. Global Internet'96. London, UK, No. 18–22 N., pp. 28–32.

Chinen K. et al: An Interactive Prefetching Proxy Server for Improvement of WWW Latency Proceedings of the Inet'97 Conference, Kuala Lumpur, Malaysia, Jun. 24–27 1997.

Zheng Wang & Jon Crowcroft, "Prefetching In World Wide Web", Department of Computer Science, University College London WC1E 6BT, United Kingdom, 1996.

Ken–ichi Chinen, et al., "An Interactive Prefetching Proxy Server For Improvement Of WWW Latency", Nara Institute Of Science And Technology, Japan.

Alonso, et al, "Dynamic Hierarchical Caching In Large–Scale Distributed File Systems", Department Of Computer Science, Princeton University, Princeton, NJ, 1992.

Azer Bestavros, "WWW Traffic Reduction And Load Balancing Through Server–Based Caching", Boston University, 1997.

Michael Baentsch, et al.: "World Wide Web Caching: The Application–Level View Of The Internet", IEEE Communications Magazine, pp. 170–178, Jun. 1997.

Syam Gadde, et al.: "Reduce, Reuse, Recycle: An Approach To Building Large Internet Caches", pp. 93–98, May 1997.

A. Ortega, et al., Soft Caching: Web Cache Management Techniques For Images, Multimedia Signal Processing, pp. 475–480, Jun. 1997.

Banga, G. et al.: "Optimistic deltas for WWW latency reduction" Proceedings Of The Usenix 1997 Annual Technical Conference, Proceedings Of Usenix 1997 Annual Technical Conference, Anaheim, CA, USA, Jan. 6–10, 1997, pp. 289–303.

Yu, P. S., et al.: "Performance Study Of A Collaborative Method For Hierarchical Caching In Proxy Servers" Computer Networks And ISDN Systems, NL, North Holland Publishing. Amsterdam. vol. 30, No. 1–7, Apr. 1, 1998, pp. 215–224.

Braun, H. et al. "Web Traffic Characterization: an Assessment of the Impact of Caching Documents from NCSA's Web Server". Computer Networks and ISDN Systems. vol. 28, pp. 37–51. Dated: Dec. 1995.

"Caching Email Document", May 11, 1999.

Carignano, A. Ortega et al. "Soft Caching: Web Cache Management Techniques For Images", IEEE. 1997.

Duska Bradley M. et al. The Measured Access Characteristics of World–Wide–Web Client Proxy Caches.

"High Performance Web Caching White Paper". CacheFlow Inc. 1998.

Lee, Ron & Gary Tomlinson. "Workload Requirements for a Very High–Capacity Proxy Cache Design". pp. 1–6.

"Microsoft Proxy Server Version 2.0.", reviewer Guide. pp. 1–74.

Rosenfeld, Louis B. "Automated Filtering of Internet Postings". XP000616769.

Smith, N. "The UK National Web Cache–The State of the Art". Computer Network adb ISDN Systems. vol. 28. pp. 1407–1414. Dated: May 1996.

Gary Tomlinson, Drew Major, Ron Lee. High–Capacity Internet Middleware: Internet Caching System Architecture Overview.

* cited by examiner

NETWORK OBJECT CACHE ENGINE

BACKGROUND OF THE INVENTION

1. Field of the Invention

This invention relates to devices for caching objects transmitted using a computer network.

2. Related Art

In computer networks for transmitting information, information providers (sometimes called "servers") are often called upon to transmit the same or similar information to multiple recipients (sometimes called "clients") or to the same recipient multiple times. This can result in transmitting the same or similar information multiple times, which can tax the communication structure of the network and the resources of the server, and cause clients to suffer from relatively long response times. This problem is especially acute in several situations: (a) where a particular server is, or suddenly becomes, relatively popular; (b) where the information from a particular server is routinely distributed to a relatively large number of clients; (c) where the information from the particular server is relatively time-critical; and (d) where the communication path between the server and its clients, or between the clients and the network, is relatively slow.

One known method is to provide a device (such as a general purpose processor operating under software control) which acts as a proxy, receiving requests for information from one or more clients, obtaining that information from one or more servers, and transmitting that information to the clients in place of the servers. When the proxy has previously obtained the information from one or more servers, it can deliver that information to the client without having to repeat the request to the server. While this method achieves the goal of reducing traffic in the network and load on the server, it has the drawback that significant overhead is required by the local operating system and the local file system or file server of the proxy. This adds to the expense of operating the network and slows down the communication path between the server and the client.

There are several sources of delay, caused primarily by the proxy's surrendering control of its storage to its local operating system and local file system: (a) the proxy is unable to organize the information from the server in its mass storage for most rapid access; and (b) the proxy is unable to delete old network objects received from the servers and store new network objects received from the servers in a manner which optimizes access to mass storage. In addition to the added expense and delay, the proxy's surrendering control of its storage restricts functionality of the proxy's use of its storage: (a) it is difficult or impossible to add to or subtract from storage allocated to the proxy while the proxy is operating; and (b) the proxy and its local file system cannot recover from loss of any part of its storage without using an expensive redundant storage technique, such as a RAID storage system.

Accordingly, it would be desirable to provide a method and system for caching information transmitted using, a computer network, which is not subject to additional delay or restricted functionality from having to use a local operating system and local file system or file server. This advantage is achieved in an embodiment of the invention in which a cache engine coupled to the network provides a cache of transmitted objects, which it stores in memory and mass storage by taking direct control of when and where to store those objects in mass storage. The cache engine may store those objects holographically so as to continue operation smoothly and recover gracefully from additions to, failures of, or removals from, its mass storage.

SUMMARY OF THE INVENTION

The invention provides a method and system for caching information objects transmitted using a computer network. In the invention, a cache engine determines directly when and where to store those objects in a memory (such as RAM) and mass storage (such as one or more disk drives), so as to optimally write those objects to mass storage and later read them from mass storage, without having to maintain them persistently. The cache engine actively allocates those objects to memory or to disk, determines where on disk to store those objects, retrieves those objects in response to their network identifiers (such as their URLs), and determines which objects to remove from the cache so as to maintain appropriate free space.

In a preferred embodiment, the cache engine collects information to be written to disk in write episodes, so as to, maximize efficiency when writing information to disk and so as to maximize efficiency when later reading that information from disk. The cache engine performs write episodes so as to atomically commit changes to disk during each write episode, so the cache engine does not fail in response to loss of power or storage, or other intermediate failure of portions of the cache. The cache engine stores key system objects on each one of a plurality of disks, so as to maintain the cache holographic in the sense that loss of any subset of the disks merely decreases the amount of available cache. The cache engine selects information to be deleted from disk in delete episodes, so as to maximize efficiency when deleting information from disk and so as to maximize efficiency when later writing new information to those areas of disk. The cache engine responds to the addition or deletion of disks as the expansion or contraction of the amount of available cache.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using general purpose processors and storage devices, special purpose processors and storage devices, or other circuits adapted to particular process steps and data structures described herein, and that implementation of the process steps and data structures described herein would not require undue experimentation or further invention.

Caching Network Objects

Figure 1:
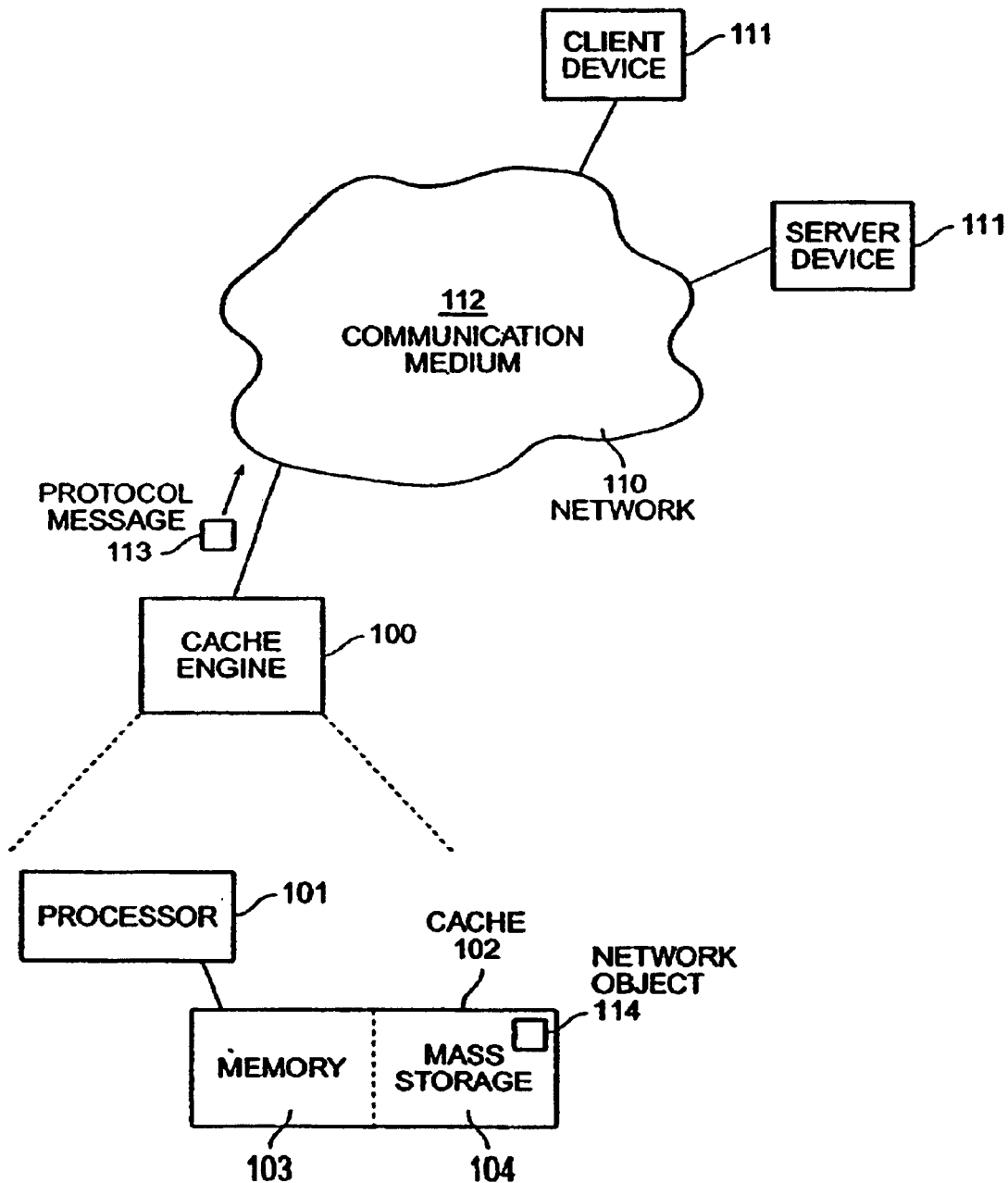
FIG. 1 shows a block diagram of a network object cache engine in a computer network.

FIG. 1 shows a block diagram of a network object cache engine in a computer network.

A cache engine 100 is coupled to a computer network 110, so that the cache engine 100 can receive messages from a set of devices 111 also coupled to the network 110.

In a preferred embodiment, the network 110 includes a plurality of such devices 111, interconnected using a communication medium 112. For example, where the network 110 includes a LAN (local area network), the communication medium 112 may comprise ethernet cabling, fiber optic coupling, or other media. The network 110 preferably includes a network of networks, sometimes called an "internet" or an "intranet."

In a preferred embodiment, the devices 111 coupled to the network 110 communicate with the cache engine 100 using one or more protocols for communication, such as HTTP (hypertext transfer protocol) or one of its variants, FTP (file transfer protocol), or other protocols.

The cache engine 100 includes a processor 101 and a cache 102. In a preferred embodiment, the processor 101 comprises a general purpose processor operating under software control to perform the methods described herein and to construct and use the data structures described herein; as used herein, when the cache engine 100 performs particular tasks or maintains particular data structures that reference includes condign operation by the processor 101 under control of software maintained in a program and data memory 103.

The cache 102 includes the program and data memory 103 and a mass storage 104. In a preferred embodiment, the mass storage 104 includes a plurality of disk drives such as magnetic disk drives, but may alternatively include optical or magneto-optical disk drives. As used herein, references to "disk" and "disk drives" refer to the mass storage 104 and its individual drives, even if the mass storage 104 and its individual drives do not include physical disk-shaped elements. The cache engine 100 is coupled to the network 110 and can receive and transmit a set of protocol messages 113 according to the one or more protocols with which the devices 111 communicate with the cache engine 100.

The cache engine 100 maintains a set of network objects 114 in the cache 102. The cache engine 100 receives protocol messages 113 from a set of "client" devices 111 to request network objects 114 to be retrieved from a set of "server" devices 111. In response thereto, the cache engine 100 issues protocol messages 113 to request those network objects 114 from one or more server devices 111, receives those network objects 114 and stores them in the cache 102, and transmits those network objects 114 to the requesting client devices 111.

As used herein, the terms "client" and "server" refer to a relationship between the client or server and the cache engine 100, not necessarily to particular physical devices 111. As used herein, one "client device" 111 or one "server device" 111 can comprise any of the following: (a) a single physical device 111 executing software which bears a client or server relationship to the cache engine 100; (b) a portion of a physical device 111, such as a software process or set of software processes executing on one hardware device 111, which portion of the physical device 111 bears a client or server relationship to the cache engine 100; or (c) a plurality of physical devices 111, or portions thereof, cooperating to form a logical entity which bears a client or server relationship to the cache engine 100. The phrases "client device" and "server device" refer to such logical entities and not necessarily to particular individual physical devices 111.

The cache engine 100 preserves the network objects 114 in the cache 102, and reuses those network objects 114 by continuing to serve them to client devices 111 which request them. When the cache 102 becomes sufficiently full, the cache engine 100 removes network objects 114 from the cache 102. For example, the cache engine 100 can remove objects as described herein in the section "Removing Objects from Cache."

In a preferred embodiment, the cache engine 100 uses the memory 103 as a cache for those network objects 114 maintained using the mass storage 104, while using the combined memory 103 and mass storage 104 as the cache 102 for those network objects 114 available on the network 110.

The cache 102 is not a file storage system, and network objects 114 which are stored in the cache 102 may be removed automatically from the cache 102 at any time by the cache engine 100. All network objects 114 and all other data maintained by the cache 102 is transient, except for a very small number of system objects which are required for operation, and those system objects are redundantly maintained on the mass storage 104 so as preserve those system objects against possible loss of a part of the mass storage 104 (such as loss of one or more disk drives). Thus the cache engine 100 need not guarantee that network objects 114 which are stored in the cache 102 will be available at any particular time after they are stored, and failure or even intentional removal of portions of the cache 102 (such as portions of the mass storage 104) cannot cause failure of the cache engine 100. Similarly, recovery or intentional addition of additional mass storage 104 (such as "hot swapping" of disk drives) is smoothly integrated into the cache 102 without interruption of operation of the cache engine 100.

Moreover, the cache engine 100 operates exclusively to perform the operation of caching the network objects 114. There is no separate "operating system," no user, and there are no user application programs which execute independently on the processor 101. Within the memory 103, there are no separate memory spaces for "user" and "operating system." The cache engine 100 itself maintains the cache 102 of the network objects 114 and selects the network objects 114 for retention in the cache 102 or removal from the cache 102, operating so as to (1) localize writing the network objects 114 to the mass storage 104, (2) localize deletion of the network objects 114 from the mass storage 104, and (3) efficiently replace the network objects 114 in the cache 102 with new network objects 114. In a preferred embodiment, the cache engine 100 performs these operations efficiently while operating the cache 102 relatively filled with network objects 114.

In a preferred embodiment, the cache engine 100 maintains statistics regarding access to the cache 102. These statistics can include the following:

a set of hit rates for the cache 102, including (1) a hit rate for network objects 114 found in the cache 102 versus those which must be retrieved from server devices 111, and (2) a hit rate for network objects 114 found in the memory 103 versus those which must be retrieved from the mass storage 104;

a set of statistics for operations on the memory 103, including (1) the number of network objects 114 which are maintained in the memory 103, and (2) the fraction of memory 103 which is devoted to caching network objects 114 versus storing system objects or unallocated; and a set of statistics for operations on the mass storage 104, including (1) the number of read operations from the mass storage 104, (2) the number of write operations to the mass storage 104, including the number of "write episodes" as described herein, and (3) the fraction of the mass storage 104 which is devoted to caching network objects 114 versus storing system objects or unallocated.

The cache engine 100 can also maintain statistics which are combinations or variants of the above.

Using the Cache Engine

There are numerous circumstances in which the cache engine 100 can provide improved performance or additional functionality in the network 110. For example, the cache engine 100 can be used as a proxy cache (whether to provide a firewall, to provide a cache for client devices 111 coupled to a local area network, or otherwise), as a reverse proxy cache, as a cache for requests made by users of a single ISP, as a cache for "push" protocols, or as an accelerator or server cache.

The cache engine 100 provides the client devices 111 with relatively quicker access to network objects 114 otherwise available directly from the server devices 111. Typically the client devices 111 request those network objects 114 from the cache engine 100, which either transmits them to the client devices 111 from the cache 102 or obtains them from the server devices 111 and then transmits them to the client devices 111.

The cache engine 100 can exercise more intelligence and proactivity than simply waiting for documents to be requested by the client devices 111:

The cache engine 100 can be configured preloaded with selected network objects 114 which are expected to be requested by the client devices 111. For example, certain network objects 114 are known to be commonly requested by client devices 111 throughout the network 110 known as the internet; these network objects 114 can be preloaded in the cache engine 100 upon manufacture. These network objects 114 could include home pages for well-known companies (such as Netscape) and well-known search engines (such as Digital's "Alta Vista").

The cache engine 100 can periodically request network objects 114 responsive to a set of statistics regarding commonly requested network objects 114. For example, information regarding commonly requested network objects 114 can be maintained on a server device 111; the cache engine 100 can request this information from the server device 111 and periodically request those network objects 114 for storage in the cache 102. In a preferred embodiment, the cache engine 100 can perform this operation periodically when client devices 111 are not actively using the cache engine 100, such as relatively unloaded times in the late night or early morning.

The cache engine 100 can periodically request network objects 114 responsive to a set of user preferences at the client devices 111. For example, the cache engine 100 can receive (either upon request or otherwise) a set of bookmarks from the client devices 111 and can request those network objects 114 from the server devices 111. In a preferred embodiment, the cache engine 100 can request those network objects 114 which have changed in a selected time period such as one day.

The cache engine 100 can provide a mirror site to one or more server devices 111, by periodically, or upon request, receiving network objects 114 from the server devices 111 to be delivered by the server device 111 to client devices 111 which have changed in a selected time period such as one day.

The cache engine 100 can provide an accelerator for one or more server devices is 111, by receiving requests to the server devices 111 which are distributed among a plurality of cache engines 100. Each cache engine 100 maintains its cache 102 with network objects 114 to be delivered by the server device 111 to client devices 111. Service by the server device 111 is thus accelerated, because each cache engine 100 can respond to some of the load of requests for information, while limiting the number of requests for information which are passed through and must be handled by the server device 111 itself.

The cache engine 100 can provide a first type of push protocol assist to one or more server devices 111, by transmitting network objects 114 to one or more client devices 111 or proxy caches using a push protocol. For example, when the server devices 111 provide a network broadcast service, the cache engine 100 can receive network objects 114 from the server devices 111 to be broadcast to a subset of the network 110 and can independently broadcast those network objects 114.

The cache engine 100 can provide a second type of push protocol assist to one or more server devices 111, by allowing those server devices 111 to broadcast network objects 114 to a plurality of cache engines 100. Each cache engine 100 can make the broadcast network objects 114 available to client devices 111 which request those network objects 114 from the cache engine 100 as if the cache engine 100 were the server device 111 for those network objects 114.

The network objects 114 can include data, such as HTML pages, text, graphics, photographs, audio, video; programs, such as Java or ActiveX applets or applications; or other types of network objects, such as push protocol objects. The cache engine 100 can record frames of streaming audio or streaming video information in the cache 102, for delayed use by a plurality of client devices 111. Some types of known network objects 114 are not cached, such as CGI output or items marked noncachable by the server device 111.

In a preferred embodiment, the cache engine 100 can glean knowledge about the client devices 111 from the protocol messages 113 or by other means, such as interrogating routing devices in the network 110, and can react in response to that information to provide differing network objects 114 to differing client devices 111. For example, the cache engine 100 can select server devices 111 for proximity or content in response to information about client devices 111, as follows:

The cache engine 100 can select a particular server device 111 for rapid response, such as for network routing proximity or for spreading service load over a plurality of server devices 111.

The cache engine 100 can select content at the server device 111 in response to information about the client device 111, such as tailoring the language of the response (such as serving pages in the English language or the French language), or such as tailoring local information (such as advertising, news, or weather). In a preferred embodiment, local information such as advertising can be retrieved from a local server device 111 which supplies advertising for insertion into pages to be served to local client devices 111.

The Cache

Figure 2:
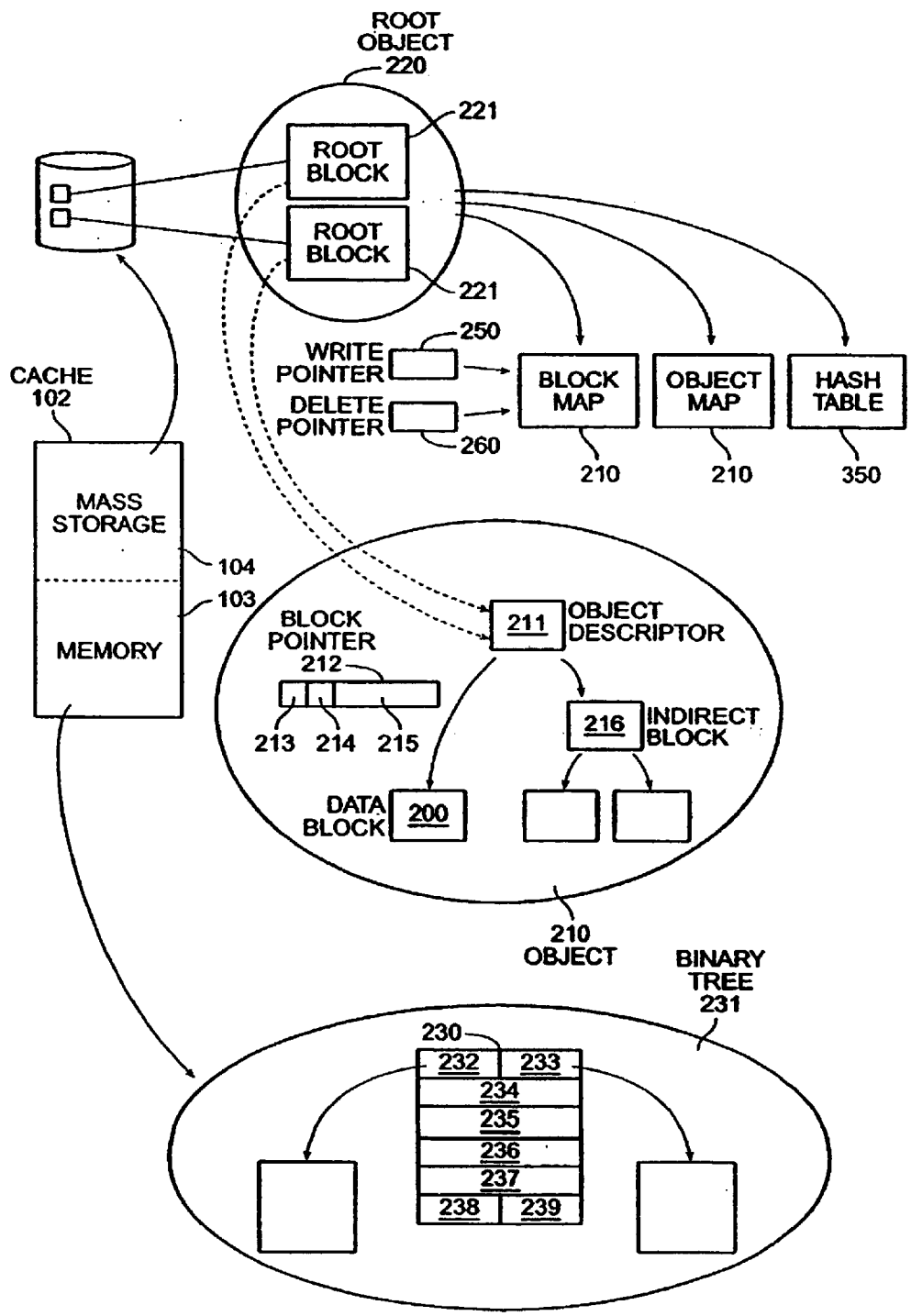
FIG. 2 shows a block diagram of a data structure for maintaining storage blocks for a set of cached network objects.

FIG. 2 shows a block diagram of a data structure for maintaining storage blocks for a set of cached network objects.

The cache 102 includes a set of blocks 200, each of which comprises 4096 bytes in a preferred embodiment, and each of which can be stored in the memory 103 or on the mass storage 104. In alternative embodiments, each of the blocks 200 can comprise a size other than 4096 bytes, and may be responsive to an amount of available memory 103 or mass storage 104.

Each of the blocks 200 can comprise either a data block 200, which includes data, that is, information not used by the cache engine 100 but maintained for the client devices 111, or control information, that is, information used by the cache engine 100 and not used by the client devices 111.

The blocks 200 are organized into a set of objects 210, each of which comprises an object descriptor 211, a set of data blocks 200, and a set of block pointers 212 referencing the data blocks 200 from the object descriptor 211. The object descriptor 211 comprises a separate control block 200. Where the block pointers 212 will not fit into a single control block 200, or for other types of relatively larger objects 210, the object descriptor 211 can reference a set of indirect blocks 216, each of which references inferior indirect blocks 216 or data blocks 200. Each indirect block 216 comprises a separate control block 200. Relatively smaller objects 210 do not require indirect blocks 216.

The block pointers 212 each comprise a pointer value 215 comprising a single 32-bit word and indicating the location of the block 200 on the mass storage 104, such as a physical disk block address.

In an alternative embodiment, the block pointers 212 each comprise a first bit 213 indicating whether the referenced block 200 is stored in the memory 103 or the mass storage 104, a second bit 214 indicating whether the referenced block 200 is a control block 200 (comprising control information) or a data block 200 (comprising data for network objects 114), and the pointer value 215 comprises a 30-bit value indicating the location of the block 200. In such alternative embodiments, when the block 200 is stored in the memory 103, the pointer value 215 indicates a byte address in the memory 103; when the block is stored on the mass storage 104, the pointer value 215 indicates a physical disk block address on the mass storage 104.

In a preferred embodiment, the objects 210 are each referenced by a root object 220, which is maintained redundantly in a plurality of (preferably two) copies of a root block 221 on each disk drive of the mass storage 104. In a preferred embodiment, there is one root object 220 for each disk drive of the mass storage 104. Thus, each disk drive of the mass storage 104 has a separate root object 210, which is maintained using two copies of its root block 221. Each disk drive's root object 220 references each current object 210 for that disk drive.

In a preferred embodiment, one copy of the root block 221 is maintained in each of physical disk blocks 2 and 3 of each of the disk drives of the mass storage 104. When the root block 221 for that disk drive is written to the mass storage 104, it is first written to the physical disk block 2, and then identically written to the physical disk block 3. When the cache engine 100 is started or restarted, the root block 221 is read from the physical disk block 2. If this read operation is successful, it is then identically rewritten to the physical disk block 3; however, if this read operation is unsuccessful, the root block 221 is instead read from the physical disk block 3, and then identically rewritten to the physical disk block 2.

In a preferred embodiment, the cache engine 100 also stores certain system objects 210 redundantly on each disk drive on the mass storage 104, so as to maintain the cache 102 holographic in the sense that loss of any subset of the disk drives merely decreases the amount of available cache.

Thus, each such system object 210 is referenced by the root object 220 for its disk drive and is maintained using two copies of its object descriptor 211. These system objects 210 which are maintained redundantly include the root object 220, a blockmap object 210, and a hash table 350 (FIG. 3), each as described herein, as well as other system objects, such as objects 210 for collected statistics, documentation, and program code.

A subset of the blocks 200 are maintained in the memory 103, so as to use the memory 103 as a cache for the mass storage 104 (just as the memory 103 and the mass storage 104 collectively act as the cache 102 for network objects 114). The blocks 200 maintained in the memory 103 are referenced by a set of block handles 230, which are also maintained in the memory 103.

Each of the block handles 230 includes a forward handle pointer 232, a backward handle pointer 233, a reference counter 234, a block address 235, a buffer pointer 236, and a set of flags 237.

The forward handle pointer 232 and the backward handle pointer 233 reference other block handles 230 in a doubly-linked list of block handles 230.

The reference counter 234 maintains a count of references to the block 200 by processes of the cache engine 100. The reference counter 234 is updated when a block handle 230 for the block 200 is claimed or released by a process for the cache engine 100. When the reference counter 234 reaches zero, there are no references to the block 200, and it is placed on a free list of available blocks 200 after having been written to disk, if it has been modified, in the next write episode.

The block address 235 has the same format as the block pointer 212. The buffer pointer 236 references a buffer used for the block 200. The flags 237 record additional information about the block 200.

In one embodiment, the block handles 230 are also threaded using a set of 2Q pointers 238 and a 2Q reference counter 239, using the "2Q" technique, as further described in "2Q: A Low Overhead High Performance Buffer Management Replacement Algorithm," by Theodore Johnson and Dennis Shasha, hereby incorporated by reference as if fully set forth herein.

How Network Objects are Cached

Figure 3:
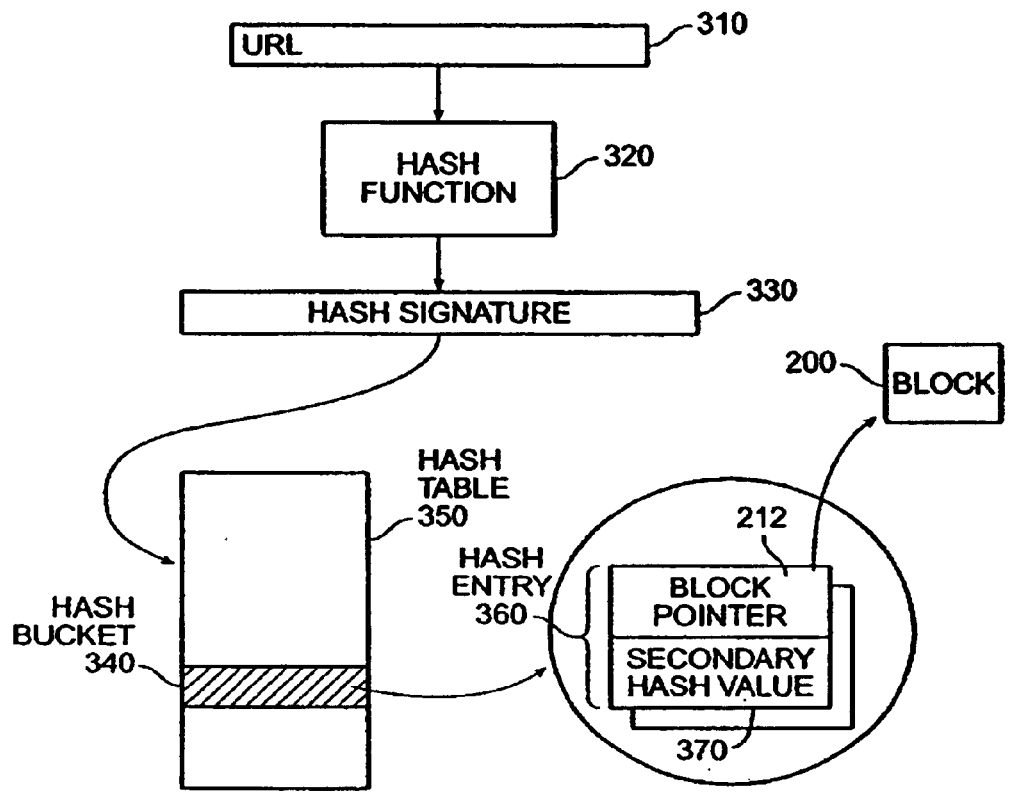
FIG. 3 shows a block diagram of data structures for caching network objects.

FIG. 3 shows a block diagram of data structures for caching network objects.

The cache engine 100 receives protocol requests from the network 110. In a preferred embodiment, each protocol request uses the HTTP protocol (or a variant such as SHTTP), and each HTTP request includes a URL (uniform resource locator) 310, which identifies a network object 114 in the network 110. In a preferred embodiment, each URL 310 identifies the server device 111 for the network object 114 and the location of the network object 114 on that server device 111.

In alternative embodiments, the cache engine 100 may use other protocols besides HTTP or its variants, and the cache engine 100 may be responsive to one or more other identifiers for network objects 114 besides its URL 310. Accordingly, as used herein, the term "URL" refers generally to any type of identifier which is capable of identifying, or assisting in identifying, a particular network object 114.

The URL 310 includes a host identifier, which identifies the server device 111 at which the network object 114 is located, and a document identifier, which identifies the location at which the network object 114 is located at the server device 111. In a preferred embodiment, the host identifier comprises a character string name for the server device 111, which can be resolved to an IP (internet protocol) address. However, in alternative embodiments, the host identifier may comprise the IP address for the server device 111, rather than the character string name for the server device 111.

The cache engine 100 includes a hash function 320 which associates the URL 310 with a hash signature 330, which indexes a hash bucket 340 in a hash table 350 in the cache 102. In a preferred embodiment, the hash table 350 comprises a set of hash tables 350, one for each disk drive, each of which references those network objects 114 which are stored in the cache 102 on that disk drive of the mass storage 104. Each such hash table 350 has its own object descriptor 211; collectively the hash tables 350 form a single logical hash table.

In a preferred embodiment, the hash signature 330 comprises a 32-bit unsigned integer value which is determined responsive to the URL 310, and which is expected to be relatively uniformly distributed over the range of all possible 32-bit unsigned integer values. In a preferred embodiment, the URL 310 is also associated with a 64-bit URL signature which is also an unsigned integer value, determined responsive to the URL 310, and which is expected to be relatively uniformly distributed over the range of all possible 64-bit unsigned integer values; when comparing URLs 310, the URL signatures are compared first, and only if they are equal are the URLs 310 themselves compared. In a preferred embodiment, the URL 310 is also converted to a canonical form prior to determining the hash signature 330 or the URL signature, such as by converting all alphabetic characters therein into a single case (lower case or upper case). In a preferred embodiment, each non-null hash bucket 340 comprises one data block 200.

Because the hash table 350 associates the URL 310 directly with the hash bucket 340 in the hash table 350, storage of the network objects 114 in the cache 102 is not hierarchical; each of the network objects 114 can be referenced and accessed from the cache 102 within order of constant time, such as less than about two disk read access times. Moreover, there is no special requirement that the network objects 114 in the cache 102 must have unique names; when network objects 114 have identical names (such as when they are old and new versions of the same network object 114), the hash table 350 simply points to the same hash bucket 340 for both of them.

When there are both old and new versions of the same network object 114, the cache engine 100 resolves new references by the URL 310 only to the new version of the network object 114. Those client devices 111 which are already accessing the old version of the network object 114 when the new version of the network object 114 is stored in the cache 102 will continue to access the old version of the network object 114. However, subsequent accesses to that network object 114, even by the same client device 111, using the URL 310 will be resolved by the cache engine 100 to the new version of the network object 114. The old version of the network object 114 is deleted as soon as possible when all client devices 111 are done using it.

The cache 102 differs from a file system also in that the client device 111 has no control over storage of the network objects 114 in the cache 102, including (1) the name space at the cache 102 for storage of the network objects 114, (2) the ability to name or rename the network objects 114, (3) whether the network objects 114 are removed from the cache 102 at any time, and (4) whether the network objects 114 are even stored in the cache 102 at all.

In a preferred embodiment, the cache engine 100 uses the memory 103 and the mass storage 104 (preferably a plurality of magnetic disk drives) to cache the network objects 114 so as to maintain in the cache 102 those network objects 114 most likely to be required by the client device 111. However, in alternative embodiments, the cache engine 100 may enforce selected administrative requirements in addition to maintaining network objects 114 most likely to be used by the client device 111, such as preferring or proscribing certain classes of network objects 114 or certain classes of client devices 111 or server devices 111, whether at all times or at selected times of day and selected days.

The cache engine 100 uses the hash function 320 and the hash table 350 to identify an object 210 (and thus one or more data blocks 200) associated with the URL 310 (and thus associated with the network object 114). The cache engine 100 operates on the object 210 to retrieve from the cache 102 the network object 114 requested by the HTTP request, and to deliver that network object 114 to the client device 111. The cache engine 100 maintains the cache 102 using the memory 103 and the mass storage 104 so that whether the object 210 is in the cache 102, and if in the cache 102, whether the object 210 is in the memory 103 or on the mass storage 104 is transparent to the client device 111 (except possibly for different time delays in retrieving the object 210 from the memory 103 or from the mass storage 104).

As described herein in the section "Writing to Disk," the cache engine 100 writes blocks 200 (and objects 210 comprising those blocks 200) from the memory 103 to the mass storage 104 on occasion, so as to maintain those blocks 200 in the memory 103 which are most frequently accessed.

As described herein, when writing blocks 200 from the memory 103 to the mass storage 104, the cache engine 100 controls where the blocks 200 are written onto the mass storage 104 (such as determining onto which disk drive for the mass storage 104 and which location on that disk drive), and when the blocks 200 are written onto the mass storage 104 (such as determining at which times it is advantageous to write data onto the mass storage 104). The cache engine 100 attempts to optimize the times and locations when and where the blocks 200 are written to disk, so as to minimize time and space required to write to and read from disk.

The hash table 350 is a system object 210, and similar to other system objects 210, includes an object descriptor 211, zero or more indirect blocks 216, and zero or more data blocks 200. Because the hash table 350 is expected to be used relatively frequently, its indirect blocks 216 are expected to all be maintained in the memory 103, although for a relatively large hash table 350 some of its data blocks 200 will be maintained on the mass storage 104. In a preferred embodiment, the hash table 350 is distributed over the plurality of disk drives for the mass storage 104, and the portion of the hash table 350 for each disk drive is referenced in the root object 220 for that disk drive.

Each hash signature 330 is indexed into the hash table 350 using the hash signature 330 modulo the number of hash buckets 340 in the hash table 350. Each hash bucket 340 comprises one block 200. Each hash bucket 340 includes zero or more hash entries 360; each hash entry 360 includes a reference to the object 210 at the hash entry 360 (comprising a pointer to the object descriptor 211 for that object 210).

The hash bucket 340 includes a secondary hash table, having a plurality of chains of secondary hash table entries (such as, for example, 32 such chains). The hash signature 330 is used to select one of the chains so as to search for the hash entry 360 associated with the URL 310.

In an alternative embodiment, the hash entries 360 are maintained within the hash bucket 340 in an ordered list by a secondary hash value, with null entries possibly interspersed (when the associated network objects 114 have been deleted or otherwise removed from the hash table 350); the secondary hash value is also determined in response to the hash signature 330, such as by computing the hash signature 330 modulo a selected value such as 232. If there are multiple hash entries 360 with the same secondary hash value, the cache engine 100 examines the object descriptor 211 associated with each one of the multiple hash entries 360 for the URL 310 of the correct network object 114 associated with the URL 310 having the associated hash signature 330**.

In a preferred embodiment, each hash bucket 340 has a selected size which is sufficient to hold at least 1.5 to 2 times the number of expected hash entries 360 if the hash entries 360 were perfectly uniformly distributed (this selected size is preferably exactly one data block 200). If a hash entry 360 is assigned to a hash bucket 340 which is full, one of the network objects 114 already associated with the hash bucket 340, along with its associated hash entry 360, is deleted from the hash bucket 340 and from the cache 102 to make room for the new hash entry 360.

In a preferred embodiment, there can be a plurality of different operational policies for selecting just which objects 210 are deletable.

Mass Storage with Multiple Disk Drives

The cache engine 100 maintains a DSD (disk set descriptor) object 210 for each disk drive currently or recently present on the mass storage 104, which includes a data structure describing that disk drive. The cache engine 100 also maintains a DS (disk set) object 210, which references all of the DSD objects 210, and which is maintained redundantly on one or more of the disk drives for the mass storage 104. Thus, the DS object 210 is maintained redundant on the mass storage 104 on a plurality of disk drives (preferably all of them), with each disk drive's information being maintained on that disk drive in the DSD object 210.

Each DSD object 210 includes at least the following information: (1) the number of disk drives; (2) the collective total size of all disk drives; (3) for each disk drive—the individual size of that disk drive, an identifier for that disk drive, and a index into an array of all the disk drives; and (4) for each disk drive—the range of hash signatures 330 which are maintained on that disk drive. Also, the range of hash signatures 330 which are maintained on each disk drive is maintained in a separate system object 210 which maps each hash signature 330 to a particular disk drive. In a preferred embodiment, sizes are expressed as multiples of a selected value such as 1 megabyte.

The hash entries 360 are distributed over the plurality of disk drives in proportion to the size of each disk drive, rounded to an integer number of hash entries 360.

When a disk drive is added, removed, or replaced, the cache engine 100 creates or modifies an associated DSD object 210, and updates the DS object 210. This operation proceeds in like manner as updating a data block 200; thus, any control blocks 200 which reference the DS object 210 or one of the. DSD objects 210 are also updated, and the update is atomically committed to the mass storage 104 with the next write episode. (Updates to the DS object 210 are atomically committed for each disk drive, one at a time.) Thus, the mass storage 104 can be dynamically updated, including changing the identity or number of disk drives, while the cache engine 100 continues to operate, and the only effect on the cache engine 100 is to alter its perception of the amount of mass storage 104 which is available for the cache 102.

Writing to Disk

The cache engine 100 implements a "delayed write" technique, in which the objects 210 which are written into the cache 102 (including objects 210 which are new versions of old objects 210 already present in the cache 102) are written first into the memory 103, and only later written out to the mass storage 104. Unlike file systems which use delayed write techniques, there is no need to provide a non-volatile RAM or a UPS (uninterruptable power supply) and an associated orderly shutdown procedure, because the cache engine 100 makes no guarantee of persistence for the network objects 114 in the cache 102. For example, if a particular network object 114 is lost from the cache 102, that network object 114 can typically be reacquired from its associated server device 111.

However, the delayed write technique operates to maintain consistency of the cache 102, by not overwriting either control blocks 200 or data blocks 200 (except for the root block 221). Instead, modified blocks 200 are written to the mass storage 104, substituted for the original blocks 200, and the original blocks 200 are freed, all in an atomic operation called a "write episode." If a write episode is interrupted or otherwise fails, the entire write episode fails atomically and the original blocks 200 remain valid.

A modified data block 200 is created when the underlying data for the original data block 200 is modified (or when new underlying data, such as for a new network object 114, is stored in a new data block 200). A modified control block 200 is created when one of the original blocks 200 (original data block 200 or original control block 200) referenced by the original control block 200 is replaced with a modified block 200 (modified data block 200, new data block 200, or modified control block 200); the modified control block 200 references the modified block 200 rather than the original block 200.

Each write episode is structured so as to optimize both the operation of writing blocks 200 to the mass storage 104 and later operations of reading those blocks 200 from the mass storage 104. The following techniques are used to achieve the read and write optimization goals:

modified blocks 200 to be written are collected and written, when possible, into sequential tracks of one of the disk drives used for the mass storage 104;

indirect blocks 216 are written to storage blocks which are close to and before those data blocks 200 which they reference, so as to enable reading the referenced data blocks 200 in the same read operation whenever possible;

sequentially related data blocks 200 are written to sequential free storage blocks (if possible, contiguous free storage blocks) on one of the disk drives used for the mass storage 104, so as to enable reading the related data blocks 200 in the same read operation whenever possible;

blocks 200 (control blocks 200 or data blocks 200) to be written are collected together for their associated objects 210 and ordered within each object 210 by relative address, so as to enable reading blocks 200 for a particular object 210 in the same read operation whenever possible.

Figure 4:
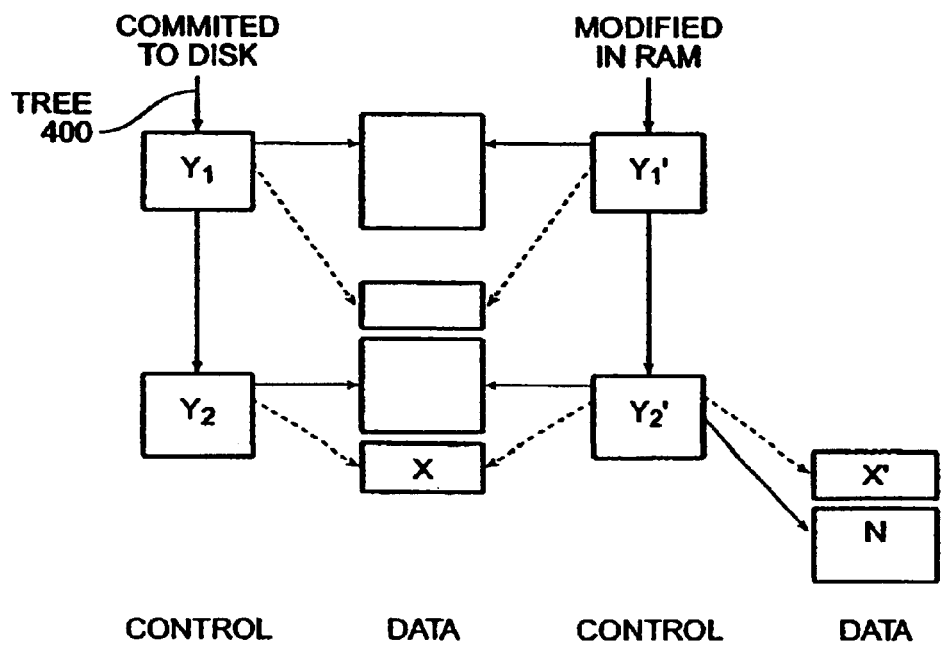
FIG. 4 shows a block diagram of a set of original and modified blocks.

FIG. 4 shows a block diagram of a set of original and modified blocks.

Figure 5:
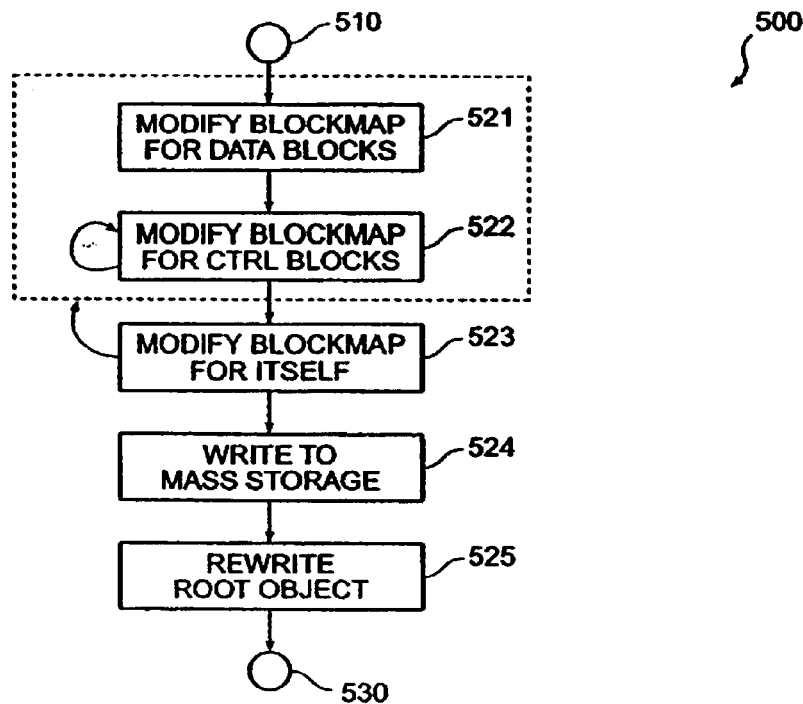
FIG. 5 shows a flow diagram of a method for atomic writing of modified blocks to a single disk drive.

FIG. 5 shows a flow diagram of a method for atomic writing of modified blocks to a single disk drive.

A tree structure 400 (FIG. 4) of blocks 200 includes the original control blocks 200 and the original data blocks 200, which have been already written to the mass storage 104 and referenced by the root object 220. Some or all of these original blocks 200 can be held in the memory 103 for use.

A method 500 (FIG. 5) includes a set of flow points to be noted, and steps to be executed, by the cache engine 100.

At a flow point 510, the modified data blocks 200 and new data blocks 200 are held in the memory 103 and have not yet been written to disk.

Because no data block 200 is rewritten in place, each original control block 200 which references a modified data block 200 (and each original control block 200 which references a modified control block 200) must be replaced with a modified control block 200, all the way up the tree structure 400 to the root object 200.

At a step 521, for each, modified data block 200, a free storage block on the mass storage 104 is allocated for recording the modified data block 200. The blockmap object 210 is altered to reflect the allocation of the storage block for the modified data block 200 and freeing of the storage block for the original data block 200.

The blockmap object 210 maintains information about which storage blocks on the mass storage 104 are allocated and have data stored therein, and which storage blocks are free and eligible for use. The cache engine 100 searches the blockmap object 210 for a free storage block, maintaining a write pointer 250 into the blockmap object 210 so as to perform the search in a round-robin manner. Thus, when the write pointer 250 advances past the end of the blockmap object 210, it is wrapped around to the beginning of the blockmap object 210. The write pointer 250 is maintained in the root object 220 so that the search continues in a round-robin manner even after a failure and restart of the cache 102.

To maintain consistency of the cache 102 in the event of a failure, a free storage block 200 cannot be considered free (and therefore used) if it is still referenced, even if indirectly, by the root object 220. Accordingly, those blocks 200 which are freed prior to atomic commitment of the root object 220 are not considered free until the root object 220 is atomically written to disk.

At a step 522, for each original control block 200 which references an original block 200 which is lo be modified in this write episode, a modified control block 200 is generated. In like manner as the step 521, a free storage block on the mass storage 104 is allocated for recording the modified control block 200. In like manner as the step 521, the blockmap object 210 is modified to reflect the allocation of the storage block for the modified control block 200 and freeing of the storage block for the original control block 200.

The step 522 is repeated for each level of the tree structure 400 up to the root object 220.

At a step 523, the operations of the step 521 and the step 522 are repeated for those blocks 200 of the blockmap object 210 which were altered.

At a step 524, the modified data blocks 200 and modified control blocks 200 (including the blockmap object 210) are written to their allocated storage blocks on the mass storage 104.

At a step 525, the root object 220 is rewritten in place on the mass storage 104.

At a flow point 530, the root object 220 has been rewritten in place, all changes to the tree structure 460 have thus been atomically committed; the modified blocks 200 have become part of the tree structure 400 and the original blocks 200 which were replaced with modified blocks 200 have become freed and eligible for reuse. The modified blockmap object 210 is not atomically committed until the root object 220 has been rewritten in place, so storage blocks which are indicated as allocated or free are not so indicated until the write episode has been atomically committed at the flow point 530.

When the modified blocks 200 are actually allocated to storage blocks and written to those storage blocks on the mass storage 104, they are written in the following manner:

the tree structure 400 is traversed in a depth-first top-down manner, so as to ensure that modified control blocks 200 are written in a sequence of storage blocks before the modified data blocks 200 they reference;

at each modified control block 200, the referenced modified data blocks 200 are traversed in a depth-first top-down manner, so as to ensure that the referenced modified data blocks 200 are clustered together in a sequence of storage blocks after the modified control block 200 which references them.

This technique helps to ensure that when reading control blocks 200, the data blocks 200 they reference are read-ahead whenever possible, so as to minimize the number of operations required to read the control blocks 200 and the data blocks 200 from the mass storage 104.

The cache engine 100 determines when to perform a write episode, in response to the condition of the memory 103 (including the number of modified blocks 200 in the memory 103), the condition of the mass storage 104 (including the number of free storage blocks available on the mass storage 104), and the condition of the cache 102 (including the hit rate of network objects 114 in the cache 102).

In a preferred embodiment, write episodes using the method 500 are performed upon either of the following conditions:

when a certain time (such as 10 seconds) have elapsed since the previous write episode; or when modified blocks comprise too large a proportion of memory.

Write episodes using the method 500 can also be performed upon either of the following conditions:

the number of modified blocks 200 in the memory 103 is near the number of available free storage blocks on the mass storage 104 minus the number of storage blocks needed for the blockmap object 210; or the fraction of modified blocks 200 in the memory 103 is near the miss rate of network objects 114 in the cache 102.

However, the number of free blocks 200 on the mass storage 104 is normally much larger than the number of blocks 200 to be written during the write episode.

Each object 210 has an associated "access time," which indicates when that object 210 was last written or read. However, it is not desirable to update the access time on disk for each object 210 whenever that object 210 is read, as this would produce a set of modified control blocks 200 (which must be written to disk during the next write episode) whenever any object 210 is read.

Accordingly, a volatile information table is maintained which records volatile information about objects 210, including access times for objects 210 which have been read, and number of accesses for those objects 210. When an object 210 is read, its access time is updated only in the volatile information table, rather than in the object descriptor 211 for the object 210 itself. The volatile information table is maintained in the memory 103 and is not written to disk.

In a preferred embodiment, network objects 114 can continue to be read while write episodes using the method 500 are being performed, even for those network objects 114 which include modified data blocks 200, because the modified data blocks. 200 continue to be maintained in the memory 103 while the write episodes are performed, whether or not they are actually successfully written to the mass storage 104.

Removing Objects from Cache

Figure 6:
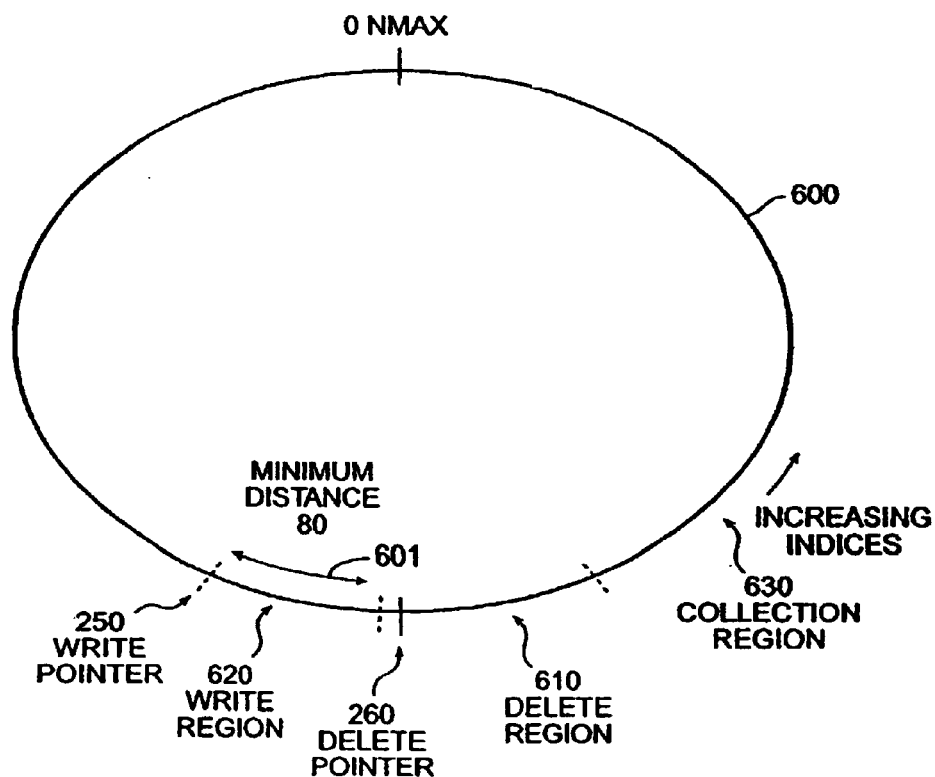
FIG. 6 shows a block diagram of a set of pointers and regions on mass storage.

FIG. 6 shows a block diagram of a set of pointers and regions on mass storage.

A set of storage blocks on each disk drive of the mass storage 104 is represented by a circular map 600, having indexes from zero to a maximum value Nmax. In the figure, indexes increase in a counterclockwise direction, wrapping around from the end to the beginning of each disk drive modulo the maximum value Nmax.

A DT (delete table) object 210 is maintained which includes an entry for each deletable object 210. Each time one of the hash buckets 340 in the hash table 350 is accessed, a reference is inserted into the DT object 210 for each object 210 which is referenced by one of the hash entries 360 in that hash bucket 340 and which qualifies as deletable.

In alternative embodiments, an objectmap object 210 is maintained which includes an entry for each of the blockmap entries in the blockmap object 210. In such alternatives, each entry in the objectmap object 210 is either empty, which indicates that the corresponding block 200 does not comprise an object descriptor 211, or non-empty, which indicates that the corresponding block 200 comprises an object descriptor 211, and further includes information to determine whether the corresponding object 210 can be deleted. Each non-empty entry in the objectmap object 210 includes at least a hit rate, a load time, a time to live value and a hash signature 330 for indexing into the hash table 350.

The cache engine 100 searches the blockmap object 210 for a deletable object 210 (an object 210 referenced by the DT object 210), maintaining a delete pointer 260 into the blockmap object 210, similar to the write pointer 250, so as to perform the search in a round-robin manner. Thus, similar to the write pointer 250, when the delete pointer 260 advances past the end of the blockmap object 210, it is wrapped around to the beginning of the blockmap object 210. Also similar to the write pointer 250, the delete pointer 260 is maintained in the root object 220 so that the search continues in a round-robin manner even after a failure and restart of the cache 102.

The write pointer 250 and the delete pointer 260 for each disk drive in the mass storage 104 each comprise an index into the map 600.

In a preferred embodiment, the delete pointer 260 is maintained at least a selected minimum distance d0 601 ahead of the write pointer 250, but not so far ahead as to wrap around again past the write pointer 250, so as to select a delete region 610 of each disk drive for deleting deletable objects 210 which is near to a write region 620 used for writing modified and new objects 210. The write region 620 is at least the size specified by the minimum distance d0 601. Although there is no specific requirement for a size of the delete region 610, it is preferred that the delete region 610 is several times (preferably about five times) the size of the write region 620. The cache engine 100 thus provides that nearly all writing to disk occurs in a relatively small part of each disk drive. This allows faster operation of the mass storage 104 because a set of disk heads for the mass storage 104 must move only relatively a small distance during each write episode.

Because the cache engine 100 attempts to maintain a relatively fixed distance relationship between the write pointer 250 and the delete pointer 260, write episodes and delete episodes will occur relatively frequently. In a preferred embodiment, the cache engine 100 alternates between write episodes and delete episodes, so that each delete episode operates to make space on disk for a later write episode (the next succeeding write episode writes the blockmap object 210 to disk, showing the blocks 200 to be deleted; the write episode after that is able to use the newly free blocks 200) and each write episode operates to consume free space on disk and require a later delete episode.

A collection region 630 is selected near to and ahead of the delete region 610, so as to select objects 210 for deletion. A size of the collection region 630 is selected so that, in an time estimated for the write pointer 250 to progress through the collection region 630 (this should take several write episodes), nearly all hash entries 360 will have been accessed through normal operation of the cache engine 100. Thus, because each hash entry 360 includes information sufficient to determine whether its associated object 210 is deletable, nearly all objects 210 will be assessed for deletion in the several write episodes needed for the write region 620 to move through the collection region 630.

Objects 210 which have been assessed for deletion are placed on an deletion list, sorted according to eligibility for deletion. In a preferred embodiment, objects 210 are assessed for deletion according to one of these criteria:

If an object 210 is explicitly selected for deletion by the cache engine 100 due to operation of the HTTP protocol (or a variant thereof, such as SHTTP), the object 210 is immediately placed at the head of the deletion list.

If a new object 210 with the same name is created, the old object 210 is placed at the head of the deletion list as soon as all references to the old object 210 are released (that is, no processes on the cache engine 100 reference the old object 210 any longer).

If an object 210 has expired, it is immediately placed at the head of the deletion list.

If a first object 210 has an older access time than a second object 210, the first object 210 is selected as more eligible for deletion than the second object 210, and is thus sorted into the deletion list ahead of the second object 210.

A fraction of objects 210 on the deletion list chosen due to the last two of these criteria (that is, due to expiration or older access time), preferably one-third of the objects 210 on the deletion list, are selected for deletion.

After each write episode, the collection region 630 is advanced by an expected size of the next write region 620. In a preferred embodiment, the expected size of the next write region 620 is estimated by averaging the size of the write region 620 for the past several (preferably seven) write episodes. Those objects 210 which were on the deletion list before advancing the delete region 610 and which are in the delete region 610 afterward are scheduled for deletion; these objects are selected individually and deleted in the next delete episode (in a preferred embodiment, the next delete episode is immediately after completion of the write episode).

In a preferred embodiment, write episodes and delete episodes for each disk drive on the mass storage 104 are independent, so there are separate deletion regions 610, write regions 620, and collection regions 630 for each disk drive on the mass storage 104.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method, including steps of:
   receiving a set of network objects in response to a first request to a server from a client; and
   maintaining said network objects in a cache memory in a cache engine, said cache engine connected via a network to the server and the client, said cache memory including mass storage;
   wherein said step of maintaining includes steps of recording said network objects in said cache memory and retrieving said network objects from said cache memory, so as to substantially minimizes a time required for retrieving said network objects from said mass storage.

2. A method as in claims 1, wherein said network objects include an HTML page to be retrieved from said cache memory and served to the client for display.

3. A method as in claim 1, including a step of serving said network objects to said client in place of said server.

4. A method as in claim 3, wherein said network objects are served to said client in place of said server in response to a second request from said client.

5. A method as in claim 3, wherein said step of serving is responsive to a resource identifier associated with each said network object.

6. A method as in claim 3, wherein said step of serving is responsive to a uniform resource locator associated with each said network object.

7. A method as in claim 1, wherein said step of receiving uses a computer network.

8. A method as in claim 1, wherein said step of receiving is responsive to protocol messages using a computer network, said protocol messages including a resource identifier for each said network object.

9. A method, including steps of:
   receiving a set of network objects in response to a first request to a server from a client; and
   maintaining said network objects in a cache memory in a cache engine, said cache engine connected via a network to the server and the client, said cache memory including mass storage;
   wherein said step of maintaining includes steps of recording said network objects in said cache memory and retrieving said network objects from said cache memory, so as to perform at least one of:
   maximizing a rate at which said network objects can be written to said mass storage,
   maximizing a rate at which said network objects can be erased from said mass storage,
   maximizing a rate at which said network objects can be retrieved from said mass storage, or
   minimizing a time required for retrieving said network objects from said mass storage.

10. A method as in claim 9, wherein said network objects include an HTML page to be retrieved from said cache memory and served to the client for display.

11. A method as in claim 9, including a step of serving said network objects to said client in place of said server.

12. A method as in claim 11, wherein said network objects are served to said client in place of said server in response to a second request from said client.

13. A method as in claim 11, wherein said step of serving is responsive to a resource identifier associated with each said network object.

14. A method as in claim 11, wherein said step of serving is responsive to a uniform resource locator associated with each said network object.

15. A method as in claim 9, wherein said step of receiving uses a computer network.

16. A method as in claim 9, wherein said step of receiving is responsive to protocol messages using a computer network, said protocol messages including a resource identifier for each said network object.

17. A method, including steps of:
   receiving a set of network objects in response to a first request to a server from a client; and
   maintaining said network objects in a cache memory in a cache engine, said cache engine connected via a network to the server and the client, said cache memory including mass storage;
   wherein said step of maintaining is performed independently of a file system for said mass storage.

18. A method, including steps of:
   receiving a set of network objects in response to a first request to a server from a client; and
   maintaining said network objects in a cache memory in a cache engine, said cache engine connected via a network to the server and the client, said cache memory including mass storage;
   wherein said step of maintaining includes a step of writing a group of network objects to said mass storage in one or more write episodes, such that said write episodes are performed so as to atomically commit changes to said mass storage during each said write episode by writing modified data and control blocks to the mass storage without erasing corresponding unmodified data and control blocks and then replacing a root node so as to atomically commit the changes.

19. A method, including steps of:
   receiving a set of network objects in response to a first request to a server from a client; and
   maintaining said network objects in a cache memory in a cache engine, said cache engine connected via a network to the server and the client, said cache memory including mass storage;
   wherein said step of maintaining includes a step of deleting a group of network objects to said mass storage in one or more delete episodes, such that said delete episodes are performed so as to atomically commit changes to said mass storage during each said delete episode by writing modified control blocks to the mass storage without erasing corresponding unmodified control blocks and then replacing a root node so as to atomically commit the changes.

20. A cache engine, including:
   a cache memory;
   an interface for interfacing to a network;
   a processor; and
   a memory storing information including instructions, the instructions executable by said processor, the instructions including steps of: (a) receiving a set of network objects in response to a first request to a server from a client; and (b) maintaining said network objects in said cache memory in said cache engine, said cache engine connected via the network to the server and the client, said cache memory including mass storage;
   wherein said step of maintaining includes steps of recording said network objects in said cache memory and retrieving said network objects from said cache memory, so as to substantially minimizes a time required for retrieving said network objects from said mass storage.

21. A cache engine as in claim 20, wherein said network objects include an HTML page to be retrieved from said cache memory and served to the client for display.

22. A cache engine as in claim 20, wherein the instructions further include a step of serving said network objects to said client in place of said server.

23. A cache engine as in claim 22, wherein said network objects are served to said client in place of said server in response to a second request from said client.

24. A cache engine as in claim 22, wherein said step of serving is responsive to a resource identifier associated with each said network object.

25. A cache engine as in claim 22, wherein said step of serving is responsive to a uniform resource locator associated with each said network object.

26. A cache engine as in claim 20, wherein said step of receiving uses a computer network.

27. A cache engine as in claim 20, wherein said step of receiving is responsive to protocol messages using a computer network, said protocol messages including a resource identifier for each said network object.

28. A cache engine, including:
a cache memory;
an interface for interfacing to a network;
a processor; and
a memory storing information including instructions, the instructions executable by said processor, the instructions including steps of: (a) receiving a set of network objects in response to a first request to a server from a client; and (b) maintaining said network objects in said cache memory in said cache engine, said cache engine connected via the network to the server and the client, said cache memory including mass storage;
wherein said step of maintaining includes steps of recording said network objects in said cache memory and retrieving said network objects from said cache memory, so as to perform at least one of:
maximizing a rate at which said network objects can be written to said mass storage,
maximizing a rate at which said network objects can be erased from said mass storage,
maximizing a rate at which said network objects can be retrieved from said mass storage, or
minimizing a time required for retrieving said network objects from said mass storage.

29. A cache engine as in claim 28, wherein said network objects include an HTML page to be retrieved from said cache memory and served to the client for display.

30. A cache engine as in claim 28, wherein the instructions further include a step of serving said network objects to said client in place of said server.

31. A cache engine as in claim 30, wherein said network objects are served to said client in place of said server in response to a second request from said client.

32. A cache engine as in claim 30, wherein said step of serving is responsive to a resource identifier associated with each said network object.

33. A cache engine as in claim 30, wherein said step of serving is responsive to a uniform resource locator associated with each said network object.

34. A cache engine as in claim 28, wherein said step of receiving uses a computer network.

35. A cache engine as in claim 28, wherein said step of receiving is responsive to protocol messages using a computer network, said protocol messages including a resource identifier for each said network object.

36. A cache engine, including:
a cache memory;
an interface for interfacing to a network;
a processor; and
a memory storing information including instructions, the instructions executable by said processor, the instructions including steps of: (a) receiving a set of network objects in response to a first request to a server from a client; and (b) maintaining said network objects in said cache memory in said cache engine, said cache engine connected via the network to the server and the client, said cache memory including mass storage;
wherein said step of maintaining is performed independently of a file system for said mass storage.

37. A cache engine, including:
a cache memory;
an interface for interfacing to a network;
a processor; and
a memory storing information including instructions, the instructions executable by said processor, the instructions including steps of: (a) receiving a set of network objects in response to a first request to a server from a client; and (b) maintaining said network objects in said cache memory in said cache engine, said cache engine connected via the network to the server and the client, said cache memory including mass storage;
wherein said step of maintaining includes a step of writing a group of network objects to said mass storage in one or more write episodes, such that said write episodes are performed so as to atomically commit changes to said mass storage during each said write episode by writing modified data and control blocks to the mass storage without erasing corresponding unmodified data and control blocks and then replacing a root node so as to atomically commit the changes.

38. A cache engine, including steps of:
receiving a set of network objects in response to a first request to a server from a client; and
maintaining said network objects in a cache memory in a cache engine, said cache engine connected via a network to the server and the client, said cache memory including mass storage;
wherein said step of maintaining includes a step of deleting a group of network objects to said mass storage in one or more delete episodes, such that said delete episodes are performed so as to atomically commit changes to said mass storage during each said delete episode by writing modified control blocks to the mass storage without erasing corresponding unmodified control blocks and then replacing a root node so as to atomically commit the changes.

39. A memory storing information including instructions, the instructions executable by a processor to control a cache engine, the instructions including steps of:
receiving a set of network objects in response to a first request to a server from a client; and
maintaining said network objects in a cache memory in the cache engine, said cache engine connected via a network to the server and the client, said cache memory including mass storage;
wherein said step of maintaining includes steps of recording said network objects in said cache memory and retrieving said network objects from said cache memory, so as to substantially minimizes a time required for retrieving said network objects from said mass storage.

40. A memory as in claim 39, wherein said network objects include an HTML page to be retrieved from said cache memory and served to the client for display.

41. A memory as in claim 39, wherein the instructions further include a step of serving said network objects to said client in place of said server.

42. A memory as in claim 41, wherein said network objects are served to said client in place of said server in response to a second request from said client.

43. A memory as in claim 41, wherein said step of serving is responsive to a resource identifier associated with each said network object.

44. A memory as in claim 41, wherein said step of serving is responsive to a uniform resource locator associated with each said network object.

45. A memory as in claim 39, wherein said step of receiving uses a computer network.

46. A memory as in claim 39, wherein said step of receiving is responsive to protocol messages using a computer network, said protocol messages including a resource identifier for each said network object.

47. A memory storing information including instructions, the instructions executable by a processor to control a cache engine, the instructions including steps of:
  receiving a set of network objects in response to a first request to a server from a client; and
  maintaining said network objects in a cache memory in the cache engine, said cache engine connected via a network to the server and the client, said cache memory including mass storage;
  wherein said step of maintaining includes steps of recording said network objects in said cache memory and retrieving said network objects from said cache memory, so as to perform at least one of:
  maximizing a rate at which said network objects can be written to said mass storage,
  maximizing a rate at which said network objects can be erased from said mass storage,
  maximizing a rate at which said network objects can be retrieved from said mass storage, or
  minimizing a time required for retrieving said network objects from said mass storage.

48. A memory as in claim 47, wherein said network objects include an HTML page to be retrieved from said cache memory and served to the client for display.

49. A memory as in claim 47, wherein the instructions further include a step of serving said network objects to said client in place of said server.

50. A memory as in claim 49, wherein said network objects are served to said client in place of said server in response to a second request from said client.

51. A memory as in claim 49, wherein said step of serving is responsive to a resource identifier associated with each said network object.

52. A memory as in claim 49, wherein said step of serving is responsive to a uniform resource locator associated with each said network object.

53. A memory as in claim 47, wherein said step of receiving uses a computer network.

54. A memory as in claim 47, wherein said step of receiving is responsive to protocol messages using a computer network, said protocol messages including a resource identifier for each said network object.

55. A memory storing information including instructions, the instructions executable by a processor to control a cache engine, the instructions including steps of:
  receiving a set of network objects in response to a first request to a server from a client; and
  maintaining said network objects in a cache memory in the cache engine, said cache engine connected via a network to the server and the client, said cache memory including mass storage;
  wherein said step of maintaining is performed independently of a file system for said mass storage.

56. A memory storing information including instructions, the instructions executable by a processor to control a cache engine, the instructions including steps of:
  receiving a set of network objects in response to a first request to a server from a client; and
  maintaining said network objects in a cache memory in the cache engine, said cache engine connected via a network to the server and the client, said cache memory including mass storage;
  wherein said step of maintaining includes a step of writing a group of network objects to said mass storage in one or more write episodes, such that said write episodes are performed so as to atomically commit changes to said mass storage during each said write episode by writing modified data and control blocks to the mass storage without erasing corresponding unmodified data and control blocks and then replacing a root node so as to atomically commit the changes.

57. A memory storing information including instructions, the instructions executable by a processor to control a cache engine, the instructions including steps of:
  receiving a set of network objects in response to a first request to a server from a client; and
  maintaining said network objects in a cache memory in the cache engine, said cache engine connected via a network to the server and the client, said cache memory including mass storage;
  wherein said step of maintaining includes a step of deleting a group of network objects to said mass storage in one or more delete episodes, such that said delete episodes are performed so as to atomically commit changes to said mass storage during each said delete episode by writing modified control blocks to the mass storage without erasing corresponding unmodified control blocks and then replacing a root node so as to atomically commit the changes.

* * * * *